US009454569B2

(12) United States Patent
Kutsch et al.

(10) Patent No.: US 9,454,569 B2
(45) Date of Patent: Sep. 27, 2016

(54) SELECTIVE EXPANSION OF A TREE HIERARCHY

(71) Applicant: International Business Machines Corporation, Armonk, NY (US)

(72) Inventors: Marcel Kutsch, Stuttgart (DE); Knut Stolze, Jena (DE); Deborah Yu, Willowdale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/322,980

(22) Filed: Jul. 3, 2014

(65) Prior Publication Data

US 2014/0317141 A1   Oct. 23, 2014

Related U.S. Application Data

(63) Continuation of application No. 12/362,963, filed on Jan. 30, 2009, now Pat. No. 8,799,315.

(51) Int. Cl.
*G06F 17/30* (2006.01)

(52) U.S. Cl.
CPC ..... *G06F 17/30424* (2013.01); *G06F 17/3092* (2013.01); *G06F 17/30554* (2013.01); *G06F 17/30941* (2013.01)

(58) Field of Classification Search
CPC ................... G06F 17/30424; G06F 17/30941; G06F 17/3092; G06F 17/30554
See application file for complete search history.

(56) References Cited

U.S. PATENT DOCUMENTS

| 5,581,756 A | 12/1996 | Nakabayashi |
| 6,424,967 B1 | 7/2002 | Johnson et al. |
| 6,643,642 B1 | 11/2003 | Habegger |
| 8,799,315 B2 | 8/2014 | Kutsch et al. |
| 2001/0025304 A1 | 9/2001 | Keith, Jr. |
| 2001/0049682 A1 | 12/2001 | Vincent et al. |
| 2004/0015506 A1 | 1/2004 | Anonsen et al. |
| 2004/0143577 A1 | 7/2004 | Shalabi et al. |
| 2005/0065965 A1 | 3/2005 | Ziemann et al. |

(Continued)

OTHER PUBLICATIONS

IBM. Partial Expansion and Scrolling of Subtree Views. IP.com Prior Art Database. IP.com, Inc. Technical Disclosure IPCOM000028656D. Published: May 26, 2004. http://priorartdatabase.com/IPCOM/000028656/. 3 pages.
Berglund et al., XML Path Language (XPath) 2.0; W3C Recommendation Jan. 23, 2007. Copyright 2007 W3C (R). [online] 128 pages, [retrieved on Jan. 27, 2009], Retrieved from the Internet: <URL: http://www.w3.org/TR/xpath20/>.
Office Action (mail date Feb. 17, 2011) for U.S. Appl. No. 12/362,963, filed Jan. 30, 2009.

(Continued)

*Primary Examiner* — James Trujillo
*Assistant Examiner* — Kurt Mueller
(74) *Attorney, Agent, or Firm* — Schmeiser, Olsen & Watts, LLP; Terry J. Carroll

(57) ABSTRACT

A method and system for expanding a template tree. A received search request includes (i) a search query and (ii) path information specifying at least one path of data nodes of the template tree. The template tree is a hierarchically organized data structure of data nodes. Each specified path in the path information includes a sequence of data nodes of the template tree. The data nodes in each sequence in each specified path are traversed. Each traversed data node that does not have a child node in the template tree is expanded to form in the template tree one or more child nodes corresponding to each expanded data node. Any other data node of the template tree is not expanded. Each formed one or more child nodes is instantiated with data values by retrieving the data values, in accordance with the search query, from at least one data source.

20 Claims, 13 Drawing Sheets

(56) References Cited

U.S. PATENT DOCUMENTS

| 2006/0004721 | A1 | 1/2006 | Bedworth et al. |
| 2008/0046440 | A1 | 2/2008 | Estes |
| 2008/0071751 | A1 | 3/2008 | Keith, Jr. |
| 2008/0114803 | A1 | 5/2008 | Chinchwadkar et al. |
| 2008/0306910 | A1 | 12/2008 | Singh |
| 2009/0171896 | A1 | 7/2009 | Hackmann et al. |

OTHER PUBLICATIONS

Response (filed May 17, 2011) for U.S. Appl. No. 12/362,963, filed Jan. 30, 2009.
Final Office Action (mail date Aug. 1, 2011) for U.S. Appl. No. 12/362,963, filed Jan. 30, 2009.
RCE (filed Nov. 1, 2011) for U.S. Appl. No. 12/362,963, filed Jan. 30, 2009.
Notice of Allowance (mail date Mar. 31, 2014) for U.S. Appl. No. 12/362,963, filed Jan. 30, 2009.

```
         [QUERY]
E101:    CALL SYSPROC.GET_CONFIG

E111:    /plist/dict/
E112:    key[.='DB2 Subsystem Specific Information']/
E113:    following-sibling::dict[1]/key[.='V81A']/
E114:    following-sibling::dict[1]/
E115:    key[.='DB2 Distributed Access Information']/
E116:    following-sibling::dict[1]/key[.='TCP/IP Port']/
E117:    following-sibling::string[1]
```

FIG. 2

```
E201:  <? xml version ="1.0" encoding ="UTF-8"?>
E202:  <plist version =" 1.0">
E203:  <dict>
E204:     <key>Document Type Name </key>
E205:     <string>DB2 for z/OS Configuration Output </string>
E206:     <key>Document Type Major Version </key><integer>1</integer>
E207:     <key>Document Type Minor Version </key><integer>0</integer>
E208:     <key>Data Server Product Name </key><string>DSN </string>
E209:     <key>Data Server Product Version </key>
E210:     <string>8.1.0.356 </string>
E211:     <key>Data Server Major Version </key><integer>8</integer>
E212:     <key>Data Server Minor Version </key><integer>1</integer>
E213:     <key>Data Server Platform </key ><string>z/OS</string>
E214:     <key>Document Locale </ key ><string>en_US</string>

E215:     <key>Common Data Sharing Group Information </key>
E216:     <dict>
E217:        <key>Data Sharing Group Name </key>
E218:        <string>DSNCAT</string>
E219:        <key>Data Sharing Group Level </key><string>810</string>
E220:        <key>Data Sharing Group Mode </key><string>N</string>
E221:        <key>SCA Status </key><string>AC</string>
E222:        <key>Number Lock Entries</key><integer>524288</integer>
E223:        <key>Number List Entries </key><integer>3025 </integer>
E224:     </dict>
```

FIG. 3

```
E225:    <key>DB2 Subsystem Specific Information</key>
E226:    <dict>
E227:       <key>V81A</key>
E228:       <dict>
E229:          <key>DB2 Subsystem Status Information</key>
E230:          <dict>
E231:             <key>DB2 Member Identifier</key><integer>1</integer>
E232:             <key>DB2 Member Name</key><string>V81A </string>
E233:             <key>DB2 Member Command Prefix</key>
E234:             <string>=</string>
E235:             <key>DB2 Member Status</key><string>ACTIVE</string>
E236:             <key>DB2 System Level</key><string>810</string>
E237:             <key>System Name</key><string>ZS17PD</string>
E238:             <key>IRLM Subsystem Name</key><string>PR21</string>
E239:          </dict>

E240:          <key>DB2 Subsystem Parameters</key>
E241:          <dict>
E242:             <key>Max Connected Database Access Threads</key>
E243:             <dict>
E244:                <key>Control Block Name</key>
E245:                <string>DSN6SYSP</string>
E246:                <key>Subsystem Parameter Name</key>
E247:                <string>CONDBAT</string>
E248:                <key>Subsystem Parameter Setting</key>
E249:                <string>0000000064</string>
E250:             </dict>
E251:          </dict>

E252:          <key>DB2 Distributed Access Information</key>
E253:          <dict>
E254:             <key>DDF Status</key><string>STARTD</string>
E255:             <key>Location Name</key><string>STLEC1</string>
E256:             <key>Lu-Name</key>
E257:             <string>USIBMSY . SYEC1DB2</string>
E258:             <key>Generic Lu-Name</key><string>-NONE</string>
E259:             <key>TCP/IP Port</key><integer>446</integer>
E260:             <key>Resynchronization Port</key>
E261:             <integer>5001</integer>
E262:             <key>IP Address</key><string>9.30.189.213</string>
E263:          </dict>
```

FIG. 3 (CONTINUED)

```
E264:       <key>Active Log Data Set Information</key>
E265:       <dict>
E266:         <key>Active Log Data Set #01</key>
E267:         <dict>
E268:           <key>Data Set Name</key>
E269:           <string>DSNC910 . LOGCOPY1 . DS01</string>
E270:           <key>Data Set Volumes</key>
E271:           <array>
E272:             <string>A</string>
E273:             <string>B</string>
E274:           </array>
E275:         </dict>

E276:         <key>Active Log Data Set #02</key>
E277:         <dict>
E278:           <key>Data Set Name</key>
E279:           <string>DSNC910 . LOGCOPY1 . DS02</string>
E280:           <key>Data Set Volumes</key>
E281:           <array>
E282:             <string>C</string>
E283:             <string>D</string>
E284:           </array>
E285:         </dict>
E286:       </dict>

E287:       <key>Resource Limit Facility Information</key>
E288:       <dict>
E289:         <key>Active Table Names</key>
E290:         <array>
E291:           <string>SYSADM . DSNRLST01</string>
E292:           <string>SYSADM . DSNRLMT01</string>
E293:         </array>
E294:       </dict>

E295:       <key>DB2 Last Restart Timestamp</key>
E296:       <date>2007-03-08T09:08:17Z</date>
E297:       <key>Connected DB2 Subsystem</key><string>Yes</string>
E298:     </dict>
E299:   </dict>
E300: </dict>
E301: </plist>
```

FIG. 3 (CONTINUED)

```
E701:   typedef struct _xmlTreeNode {
E702:           xmlTreeNodeType type;
E703:           const char *xmlTagName;
E704:           char *nodeText;
E705:           struct _xmlTreeNode *parentNode;
E706:           struct _xmlTreeNode *child;
E707:           struct _xmlTreeNode *sibling;
E708:   } xmlTreeNode;
```

FIG. 7

```
E801:   struct _xmlTreeNode;
E802:   typedef struct _xmlTreeNode *(xmlSubTreeGenerator) ( void *) ;
E803:   typedef struct _xmlTreeNode {
E804:        xmlTreeNodeType type;
E805:        const char *xmlTagName;
E806:        char *nodeText;
E807:        struct _xmlTreeNode *parentNode;
E808:        struct _xmlTreeNode *child; /* pointer to first child */
E809:        struct _xmlTreeNode *sibling;
E810:        xmlSubTreeGenerator *subTreeGenerator;
E811:        void *subTreeGeneratorData;
E812:   } xmlTreeNode;
```

FIG. 8

```
E901:   xmlTreeNode *xmlGetChild (xmlTreeNode *node)
E902:   {
E903:           if (NULL != node->child) {
E904:                   return node->child;
E905:           }

E906:           if (NULL != node->subTreeGenerator)
E907:           {
E908:                   xmlTreeNode generatedSubTree =
E909:                           node->subTreeGenerator (
E910:                                   node->subTreeGeneratorData );

E911:                   node->child = generatedSubTree;

E912:                   node->subTreeGenerator = NULL;
E913:           }
E914:           return node->child;
E915:   }
```

FIG. 9

SELECTIVE EXPANSION OF A TREE HIERARCHY

This application is a continuation application claiming priority to Ser. No. 12/362,963, filed Jan. 30, 2009, now U.S. Pat. No. 8,799,315, issued Aug. 5, 2014.

FIELD OF THE INVENTION

The present invention discloses a system and associated method for generating on-demand data structure representing a database search result per a retrieval request to minimize consumption of computing resource in utilizing a database system.

BACKGROUND OF THE INVENTION

A conventional information technology (IT) system generates an output representing configuration information pertinent to the system in the Extensible Markup Language (XML) format. While the output is generated as an XML document, the information to generate the XML document is ordinarily provided by numerous data sources of various forms which are not in the XML format. The size of the XML document generated from the records often becomes excessively large when the system is complex. A conventional method that generates the output as the XML document describing a complete configuration of the system wastes significant amount of computing resources because a user of the system ordinarily requests only a portion of information pertinent to the system and consequently the rest of the XML document is discarded without being used.

Thus, there is a need for a system and associated method that overcomes at least one of the preceding disadvantages of current methods and systems of generating outputs in the XML format from non-XML records stored in an information system.

SUMMARY OF THE INVENTION

An embodiment of the invention provides a method for selectively constructing a search result for a data requested by a search request, said method performed by executing instructions on a processor of a computer system, said instructions stored on a computer readable memory unit coupled to the processor, said method comprising:

receiving the search request from a user program, the search request comprising a query and path information of a data node, the data node having the data requested by the search request, the query specifying a procedure stored in the computer system to generate the search result, the path information specifying a hierarchical address of the data node in the search result, the search result comprising the data node, wherein the search result is a data structure organized in a hierarchy such that the data node is uniquely identified within the search result by the path information of the data node;

generating the search result by executing the procedure specified in the query using a template tree stored in the computer system, wherein the template tree comprising at least one node is organized in the hierarchy, said hierarchy being identical to the hierarchy of the search result;

selecting the data node that satisfies the path information from the generated search result; and transferring the selected data node to the user program that sent the search request, wherein the user program runs on another computer system coupled to the computer system through a communication medium.

An embodiment of the invention provides a computer program product, comprising a computer usable storage medium having a computer readable program code embodied therein, said computer readable program code containing instructions that when executed by a processor of a computer system implement a method for selectively constructing a search result for a data requested by a search request, said method comprising:

receiving the search request from a user program, the search request comprising a query and path information of a data node, the data node having the data requested by the search request, the query specifying a procedure stored in the computer system to generate the search result, the path information specifying a hierarchical address of the data node in the search result, the search result comprising the data node, wherein the search result is a data structure organized in a hierarchy such that the data node is uniquely identified within the search result by the path information of the data node;

generating the search result by executing the procedure specified in the query using a template tree stored in the computer system, wherein the template tree comprising at least one node is organized in the hierarchy, said hierarchy being identical to the hierarchy of the search result;

selecting the data node that satisfies the path information from the generated search result; and transferring the selected data node to the user program that sent the search request, wherein the user program runs on another computer system coupled to the computer system through a communication medium.

An embodiment of the invention provides a computer system comprising a processor and a computer readable memory unit coupled to the processor, said memory unit containing instructions that when executed by the processor implement a method for selectively constructing a search result for a data requested by a search request, said method comprising:

receiving the search request from a user program, the search request comprising a query and path information of a data node, the data node having the data requested by the search request, the query specifying a procedure stored in the computer system to generate the search result, the path information specifying a hierarchical address of the data node in the search result, the search result comprising the data node, wherein the search result is a data structure organized in a hierarchy such that the data node is uniquely identified within the search result by the path information of the data node;

generating the search result by executing the procedure specified in the query using a template tree stored in the computer system, wherein the template tree comprising at least one node is organized in the hierarchy, said hierarchy being identical to the hierarchy of the search result;

selecting the data node that satisfies the path information from the generated search result; and transferring the selected data node to the user program that sent the search request, wherein the user program runs on another computer system coupled to the computer system through a communication medium.

An embodiment of the invention provides a method and system that overcomes at least one of the current disadvantages of conventional method and system for constructing a search result comprising data not specifically requested by a search request.

BRIEF DESCRIPTION OF THE DRAWINGS

FIG. 2 illustrates an example of a search request comprising query and path information, in accordance with the embodiments of the present invention.

FIG. 3 illustrates an example of a partial Extensible Markup Language (XML) document describing a portion of configuration parameters for the DB2 database running on a z/OS system, in accordance with the embodiments of the present invention.

FIG. 7 illustrates an example of tree node type employed in conventional XML documents.

FIG. 8 illustrates an example of tree node type extended for a subtree generator callback function based on the tree node type of FIG. 7, in accordance with the embodiments of the present invention.

FIG. 9 illustrates an example of an operator referred to as xmlGetchild( ), in accordance with the embodiments of the present invention.

DETAILED DESCRIPTION OF THE INVENTION

Figure 1:
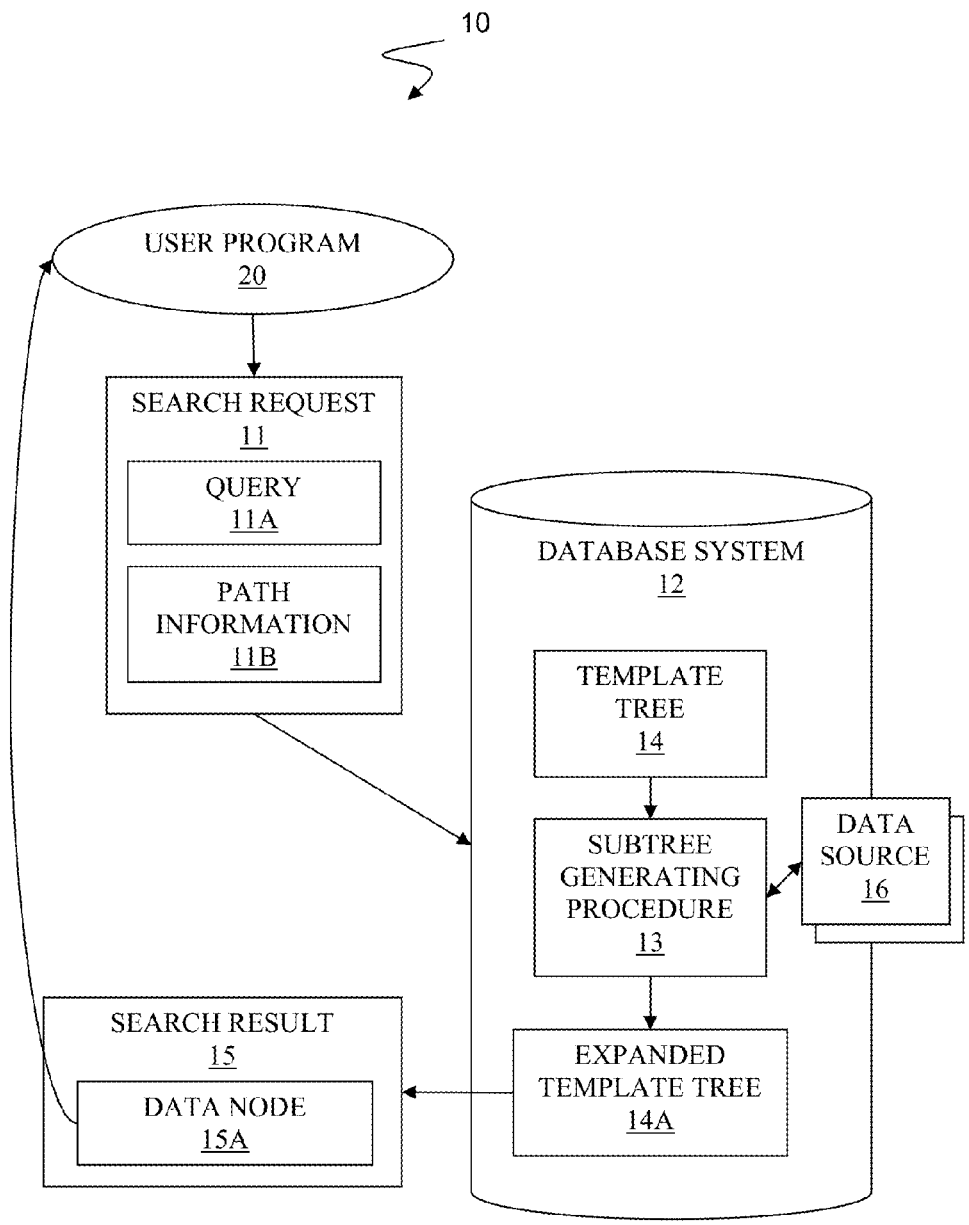
FIG. 1 illustrates a system for selectively constructing a search result pursuant to a search request, in accordance with embodiments of the present invention.

FIG. 1 illustrates a system 10 for selectively constructing a search result 15 pursuant to a search request 11, in accordance with embodiments of the present invention.

The system 10 comprises the search request 11, a database system 12, the search result 15, and at least one data source. The search result 15 comprises at least one data node.

The search request 11 is provided by a user program 20 of the database system 12. The user program 20 may be, inter alia, a program running on an administrative console, any interface program enabling a human administrator to access the database system, a client program of the database system 12, etc. The search request 11 comprises query 11A and path information 11B of a data node 15A of said at least one data node for which the user program 20 searches. The search request 11 specifies the path information 11B of the data node 15A that the user program 20 is interested in retrieving from the database system 12 pertaining to database configuration parameters.

The query 11A of the search request 11 directs the database system 12 to execute a subtree generating procedure 13 on a template tree 14. The path information 11B of the search request 11 specifies a hierarchical address of the data node 15A within the expanded template tree 14A. See FIG. 2, infra, for an example of the search request 11.

The database system 12 comprises the template tree 14 and the subtree generating procedure 13. The database system 12 traverses the template tree 14 according to the path information 11B and invokes the subtree generating procedure 13 for nodes in the template tree 14. The template tree 14 comprises nodes that may be dynamically expanded to materialize the data node 15A upon executing the subtree generating procedure 13 on a traversed node of the template tree 14. As a result of executing the subtree generating procedure 13 to all nodes of the template tree 14 that are specified in the path information 11B, the database system 12 produces an expanded template tree 14A.

The subtree generating procedure 13 accesses a data source 16 of said at least one data source to collect information necessary to materialize the data node 15A. The data source 16 may be, inter alia, a component of the database system 12, a system or a device external to the database system that has the information for the data node 15A and communicable with the subtree generating procedure 13, etc.

The subtree generating procedure 13 generates the expanded template tree 14A comprising the data node 15A pursuant to the path information 11B of the search request 11. The subtree generating procedure 13 takes the path information 11B of the search request 11 as input to use the path information 11B for selectively constructing the search result 15 comprising the data node 15A by expanding nodes in the template tree 14 that are specified in the path information 11B. Nodes that are not specified in the path information 11B need not be expanded and data for such nodes are not collected from said at least one data source.

The subtree generating procedure 13 reduces amounts of computing resources consumed to generate the search result 15 by selectively collecting data specified by the path information 11B of the search request 11 and by constructing an XML document of the search result 15 with the selectively collected data. A conventional method collects data for all possible search result, constructs a search result document, and filters requested data from the search result document. Consequently, the conventional method wastes computing resources to generate the search result document containing data that had not been specifically requested and consequently may be discarded by the user program 20 without being used. In generating an XML document representing the search result 15 comprising only a portion of database configuration parameters that the user program 20 had requested, the XPath information is used to select the data node 15A that is associated with a database configuration parameter.

The subtree generating procedure 13 expands nodes in the template tree 14. Nodes in the template tree 14 carry a respective subtree generator callback function. The template tree 14 can be traversed as if the template tree 14 is an ordinary tree with materialized data nodes. The template tree 14 represents a high-level structure of the XML document constituting the search result 15 but does not initially contain data in subtrees of all nodes. When a subtree in the template tree 14 is accessed for which data associated with a root node of the subtree is not yet collected, the subtree is dynamically expanded by performing a subtree generator callback function upon the root node of the subtree. The subtree generator callback function builds a corresponding subtree of the root node of the subtree and injects the built corresponding subtree into the template tree 14 that results in the expanded template tree 14A. The subtree generating procedure 13 is completely transparent to conventional traversal algorithm using the database system 12, wherein the traversal algorithm properly handles errors pursuant to the error handling implemented by the subtree generator callback functions.

A subtree is constructed only if a root node of the subtree is accessed, pursuant to the path information 11B provided in the search request 11. Consequently, there is no wasted computing resource to create a search result that is not specifically requested by the user program 20.

In one embodiment of the present invention, the query 11A of the search request 11 is provided as a statement in the Structured Query Language (SQL), the path information 11B of the search request 11 is provided as an XML Path Language (XPath) expression, and the subtree generating procedure 13 generates the database search result 15 in the Extensible Markup Language (XML) format. XPath is an expression language that allows the processing of values conforming to the data model used in XML documents which is defined in XQuery/XPath Data Model (XDM). The data model provides a tree representation of XML documents as well as atomic values such as integers, strings, and Booleans, and sequences that may contain both references to nodes in an XML document and atomic values. The result of an XPath expression may be a selection of nodes from the input documents, or an atomic value, or more generally, any sequence allowed by the data model. The name "Xpath" emphasizes the feature of the language representing "path" that provides a means of hierarchic addressing of nodes in an XML tree. See an example of the query 11A and the path information 11B of FIG. 2, infra.

In this embodiment, IBM® DB2® database system running on IBM z/OS® system is employed to implement the present invention. (IBM, DB2, and z/OS are registered trademarks of the International Business Machines, Inc, in the United States and/or in other countries.) A Data Server Admin Console (DSAC) is a product offered by IBM that provides an interface for a user to perform tasks in different database systems comprising the DB2 database system on z/OS system and other compatible database systems. The DSAC provides a set of stored procedures for each database system that collects, inter alia, operating system configuration information, database configuration information, etc. Operating system configuration information may be, inter alia, a level of the installed operating system, the number of processors in the computer system and respective serial numbers of each processor, the amount of real and virtual storage comprising main memory and disk storage, version information of installed software packages and patches, etc. Database configuration information may be, inter alia, registry variables, database manager configuration parameters, special register values, configuration for members in distributed/partitioned setups of the database system, resource limitation, network configuration comprising Transport Control Protocol/Internet Protocol (TCP/IP) configuration, etc.

There are time-consuming processes to generate a search result for the DB2 system. For example, if a list of client programs connected to a DB2 system is to be shown and the status of each connection (active, idle, died due to network error, etc.) is to be summarized, collecting data for all connections may take a long time. Another example may be building a list of all DB2 modules that are more than 4,000 which results in a complex XML document that takes several seconds to be compiled. Such exhaustive data collection and process over, inter alia, system-wide database configuration parameters, configuration parameters from other system components such as operating system or other application program, can be saved with this embodiment of the present invention because only the specific information requested by the user program will be generated as a search request in the XML format.

This embodiment of the present invention saves the amount of time and memory space required to gather all information to generate an XML document comprising whole database configuration parameters by generating a search result in the XML format with only the information requested by the user program as specified by the path information in the XPath format. Data collection is especially expensive and time-consuming if the information to be collected is encapsulated in other data structures such as subtrees. Because this embodiment produces a smaller XML document with a limited amount of information, this embodiment also improves memory consumption necessary to service a search request for a database system, and consequently improves memory management operation efficiency such as number of swapping and paging. Memory utilization is improved due to less memory blocks to be loaded to service the search request, and consequently caching performance is improved.

In another embodiment of the present invention, the subtree generating procedure may generate not only tree structures of XML or Hypertext Markup Language (HTML), but also generate any other tree-like data structure pursuant to the purpose of the data structure as used by an application. For example, B-Trees that are usually used to implement indexes in relational database systems may be more efficiently generated by the method of the present invention. In data-warehousing scenarios, some of such B-Trees are constructed during the execution of complex queries to speed up executing the query. Wherein a query requires part of the index, the method of the present invention is beneficial to construct such B-Trees step-by-step, whenever a subtree is needed instead of constructing the full index tree. Selectively constructing the index tree saves processing time and reduces storage requirements while not impacting the access to the B-Tree significantly.

Still another embodiment of the present invention is employed to expand siblings of a given level in a tree instead of expanding child nodes to build a subtree of a node. An operator accessing a sibling node can be redefined to invoke a respective callback function on demand. Furthermore, wherein a tree is used to access secondary or ternary data structures that may be nested or additional to main data structure, such auxiliary data structures may be expanded on-demand without being processed up front. An application comprising callback functions to generate such auxiliary data structure and to inject generated auxiliary data structure only upon being requested will significantly improve search performance and management time of a database system with such auxiliary data structures.

FIG. 2 illustrates an example of a search request comprising query and path information, in accordance with the embodiments of the present invention.

In the search request of FIG. 2, the user program of the database system wants to get the number of a network (TCP/IP) port on which DB2 is listening. The path information represented in XPath expression filters a data node in an XML document that is hierarchically structured.

Line E101 "CALL SYSPROC.GET_CONFIG" is an example of the query of the search request in the SQL format commanding the database system to invoke a procedure referred to as "SYSPROC.GET_CONFIG".

Lines E111 to E117 is an example of the path information of the search request in the XPath expression format. There are four levels of key nodes, from the top level, 'DB2 Subsystem Specific Information' in line E112, 'V81A' in line E113, 'DB2 Distributed Access Information' in line E115, and 'TCP/IP Port' in line E116. A data node that is filtered by the XPath expression in lines E111 to E117 is a search result that the search request attempts to retrieve from the database system. The XPath expression filters the integer '446' of line E259 of FIG. 3, infra. See description of FIG. 3, infra, for details.

In conventional method of filtering a data node with an XPath expression, a data node is obtained by pruning an XML tree using the XPath expression by traversing the XML tree from the root and removes each node that does not satisfy the XPath expression.

In the example of FIG. 2, the path information represented in XPath expression is utilized by a procedure stored in the DB2 database system in collecting information. The procedure connects only to a component that holds the network port number referred to as the Distributed Data Facility (DDF) of the DB2 database system, and retrieves the network port number. Because only the DDF component has information on the network port number, by using the XPath expression in collecting information the procedure needs not access any other component of the DB2 database system. Consequently, the procedure in the DB2 database system can produce the requested network port number or any other specific information requested by a user program while using minimal amount of memory and processor cycles without causing overhead arising from inter-process communications when attempting to construct an XML document with full information and then pruning the XML document with the XPath expression. See descriptions of FIGS. 5 and 6, infra, for further details of how to utilize the XPath expression in the present invention.

FIG. 3 illustrates an example of a partial Extensible Markup Language (XML) document describing a portion of configuration parameters for the DB2 database running on a z/OS system, in accordance with the embodiments of the present invention.

The XML document of FIG. 3 is a part of a whole XML document that represents an entire set of configuration information of the DB2 database running on a z/OS system. When a conventional method of generating a search result in the XML format is used, an XML document with the entire set of configuration information is generated upon a search request for a database configuration parameter. The example XML document of FIG. 3 illustrates only a part of the entire set of configuration information.

The XML document is generated from data records and/or by other components as stored in the database system, which is not in the XML format. The example XML document represents various configuration parameters of the database system wherein the database system is DB2 database system for z/OS.

A routine stored in the database system accesses database configuration parameters. Conventionally, all database configuration parameters are represented in an XML document for the routine in the database system and the XML document is provided to the user program which had invoked the routine to access the database configuration parameters.

As noted in the description of FIG. 2, supra, the XML document is hierarchically constructed with multiple key nodes in their respective level. The example XML document of FIG. 3 is logically partitioned into several independent components.

Lines E201 and E202 is an XML document header.

Lines E203 to E300 contain data nodes comprising configuration information of the DB2 database system.

Lines E204 to E214 illustrate common headers for database configuration information. Each <key> node_name </key> node is followed by a value of the respective node_name node in a respective data type.

Lines E215 to E224 illustrate a data sharing group designated by a Common Data Sharing Group Information key node. Each sub-key of the Common Data Sharing Group Information key node has a respective sub-key node name followed by a respective value of each sub-key node.

Lines E226 to E299 illustrate database subsystem specific information designated by DB2 Subsystem Specific Information key node in line E225. A subsystem with a key node "V81A" in line E227 is illustrated in lines E228 to E298.

Under V81A key node, there are several logical data groups. Lines E230 to E239 illustrate DB2 subsystem status information designated by DB2 Subsystem Status Information key node in line E229. Each sub-key node of the DB2 Subsystem Status Information key node has a respective sub-key node name followed by a respective value of each sub-key node.

Lines E240 to E251 illustrate DB2 subsystem parameters designated by DB2 Subsystem Parameters key node in line E240. Each sub-key node of the DB2 Subsystem Parameters key node has a respective sub-key node name followed by a respective value of each sub-key node.

Lines E252 to E263 illustrate DB2 distributed access information designated by DB2 Distributed Access Information key node in line E252. Each sub-key node of the DB2 Distributed Access Information key node has a respective sub-key node name followed by a respective value of each sub-key node.

Lines E264 to E286 illustrate active log data set information designated by Active Log Data Set Information key node in line E264. There are two sets of active log data set, the first set in lines E266 to E275 designated by Active Log Data Set #1 key node in line E266, and the second set in lines E276 to E285 designated by Active Log Data Set #2 key node in line E276.

Lines E287 to E294 illustrate resource limit facility information designated by Resource Limit Facility Information key node in line E287.

Lines E295 to E296 illustrate the last restart time designated by DB2 Last Restart Timestamp key node in line E295.

Line E297 illustrates connection information designated by Connected DB2 Subsystem key node.

Applying XPath expression of FIG. 2, supra, to the example XML document of FIG. 3, a traversal procedure finds the "DB2 Subsystem Status Information" key node after matching 'DB2 Subsystem Specific Information' key node and 'V81A' key node in the XPath expression. Because "DB2 Subsystem Status Information" key node does not match the next condition of [.='DB2 Distributed Access Information'] in the XPath expression, a subtree Of "DB2 Subsystem Status Information" key node is removed without traversing child nodes. Collecting information comprising the subtree to be removed is unnecessary because collected information is neither used internally nor provided to the user program. It is also true for sibling nodes of "DB2 Distributed Access Information" key node. Only "DB2 Distributed Access Information" key node and subtree of "DB2 Distributed Access Information" key node are retained as a result of selectively constructing the XML tree by the XPath expression. Child nodes of "DB2 Distributed Access Information" key node in the subtree are dynamically expanded for further testing of the XPath expression.

Figure 4:
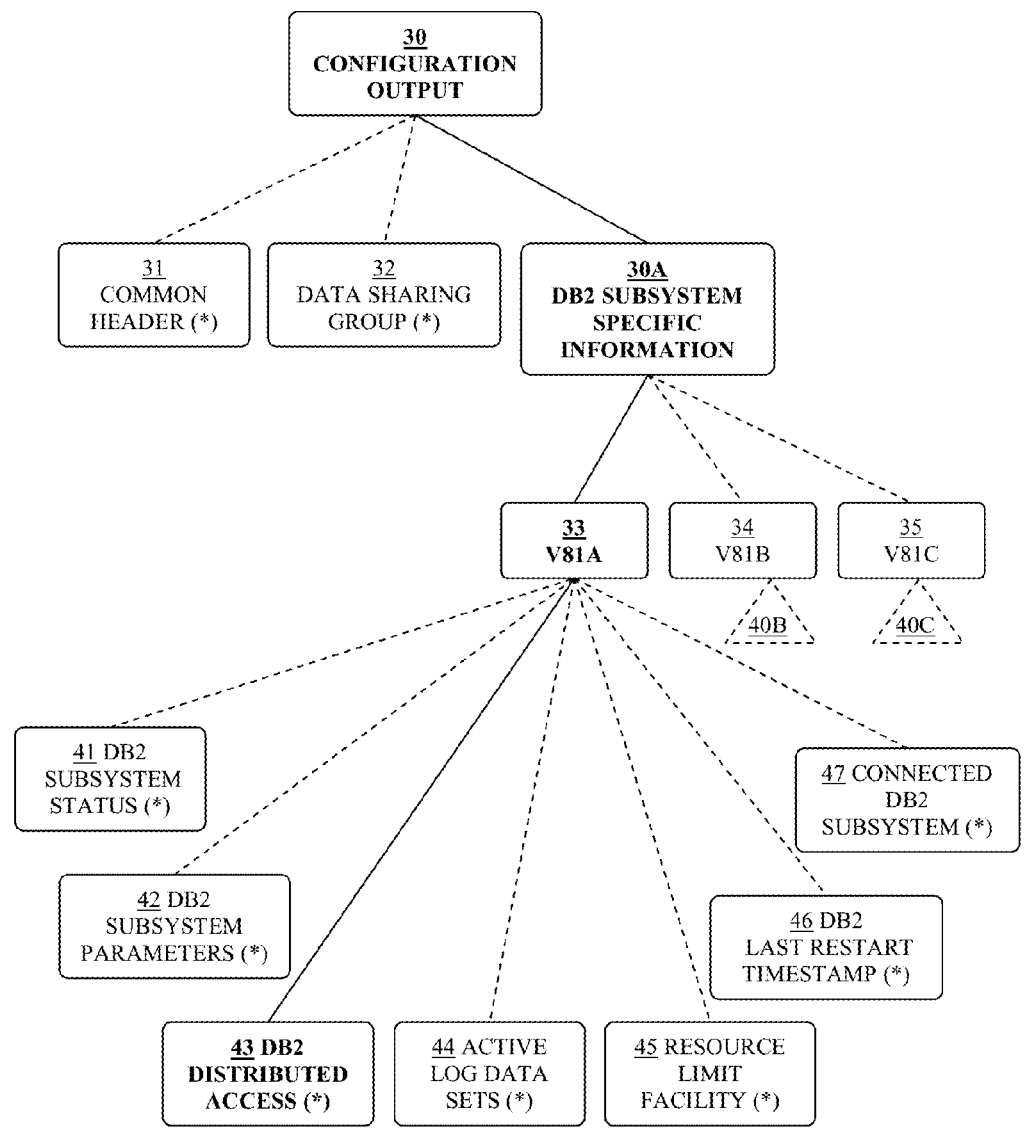
FIG. 4 illustrates a template tree for the example XML document of FIG. 3, in accordance with the embodiments of the present invention.

FIG. 4 illustrates a template tree for the example XML document of FIG. 3, supra, in accordance with the embodiments of the present invention.

Each numbered item of the template tree of FIG. 4 represents a respective logical partition of the example XML document of FIG. 3, supra. Each numbered item of the template tree of FIG. 4 also functions as a special node that may invoke the subtree generator callback when the node matches path information in the search request to generate the search result. Each node marked with (*) indicates that said each node can be expanded by invoking a subtree generator callback.

A configuration output 30 illustrates the string value of Document Type Name key node in line E204 of FIG. 3, supra. The configuration output 30 represents a root node of the template tree. The configuration output 30 has three child nodes of a common header 31, a data sharing group 32, and DB2 subsystem specific information 30A.

The common header 31 node represents common headers for database configuration information designated by a respective key node illustrated in lines E204 to E214 of FIG. 3, supra.

The data sharing group 32 node represents a data sharing group designated by a Common Data Sharing Group Information key node illustrated in lines E215 to E224 of FIG. 3, supra.

The DB2 subsystem specific information 30A node has three child nodes of a V81A 33, a V81B 34, and a V81C 35, which indicates respective name of three DB2 subsystems. The DB2 subsystem specific information 30A node is used to collectively represents three DB2 subsystems and organizes respective data that is specific to respective DB2 subsystem.

The V81A node 33, the V81B node 34, and the V81C node 35 represents a set of data that is specific to each DB2 subsystem. Each DB2 subsystem node of the V81A node 33, the V81B node 34, and the V81C node 35 has a respective DB2 subsystem status node 41, a respective DB2 subsystem parameters node 42, a respective DB2 distributed access node 43, a respective active log data sets node 44, a respective resource limit facility node 45, a respective DB2 last restart timestamp node 46, and a respective connected DB2 subsystem node 47. Subtrees of the V81B node 34 and the V81C node 35 are shown as a respective subtree 40B and 40C that comprises respective nodes analogous to the nodes of 41 to 47.

The V81A node 33, the V81B node 34, and the V81C node 35 are also member nodes of the data sharing group represented by the data sharing group node 32. The member nodes share configuration parameters common to all member nodes. See listed common configuration parameters shared by the V81A node 33, the V81B node 34, and the V81C node 35 in lines E217 to E223 of FIG. 3, supra.

Applying the XPath express of FIG. 2, supra, the template tree is traversed from the configuration output node 30 to the DB2 subsystem specific information node 30A, then to the V81A node 33, and then to the DB2 distributed access node 43 as shown in solid lines. Other nodes 41, 42, 44, 45, 46, and 47 that do not satisfy the XPath expression of FIG. 2, supra, remain unexpanded without invoking a respective subtree generator callback and there is no need to collect and to process data for nodes 41, 42, 44, 45, 46, and 47 as in conventional methods of constructing a full XML tree and then pruning the XML tree according to the XPath expression.

Figure 5:
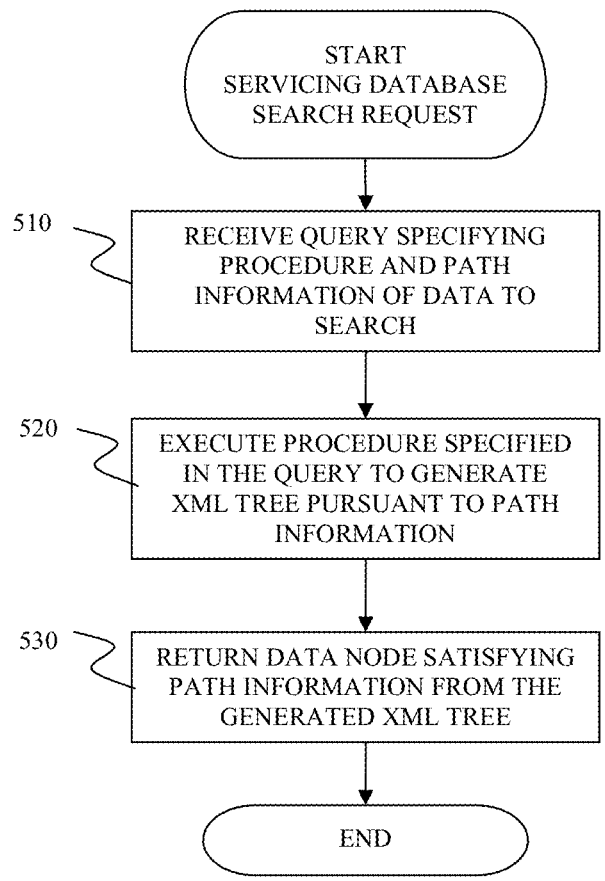
FIG. 5 is a flowchart depicting a method for efficiently servicing a database search request by selectively constructing a search result, in accordance with the embodiments of the present invention.

FIG. 5 is a flowchart depicting a method for efficiently servicing a database search request by selectively constructing a search result, in accordance with the embodiments of the present invention.

In step 510, the database system receives the search request comprising query and path information from a user program of the database system. The query specifies which stored procedure in the database system to perform. The path information specifies a hierarchical address of a data node that the user program which had sent in the search request.

In step 520, the database system executes the stored procedure specified in the query to generate an XML tree comprising expanded data nodes satisfying the path information from a template tree comprising unexpanded nodes. The template tree has nodes that are not fully expanded prior to perform the stored procedure and dynamically expanded upon satisfying the path information provided in the search request upon a traversal. A node in the template tree that can be dynamically expanded is associated with a subtree generating callback function and is referred to as a subtree generator node. The template tree may be dynamically constructed upon invoking another stored procedure of the database that creates subtree generator nodes in the template tree. The procedures that constructs the template tree and expands the constructed template tree by generating subtrees may be employed with other general procedures of conventional database system. See description of FIG. 6, infra, for details on operation of the subtree generating callback function for each node in the path information.

In step 530, the database system returns a data node that satisfies the path information of the search request from the generated XML tree to a sender of the search request.

Figure 6:
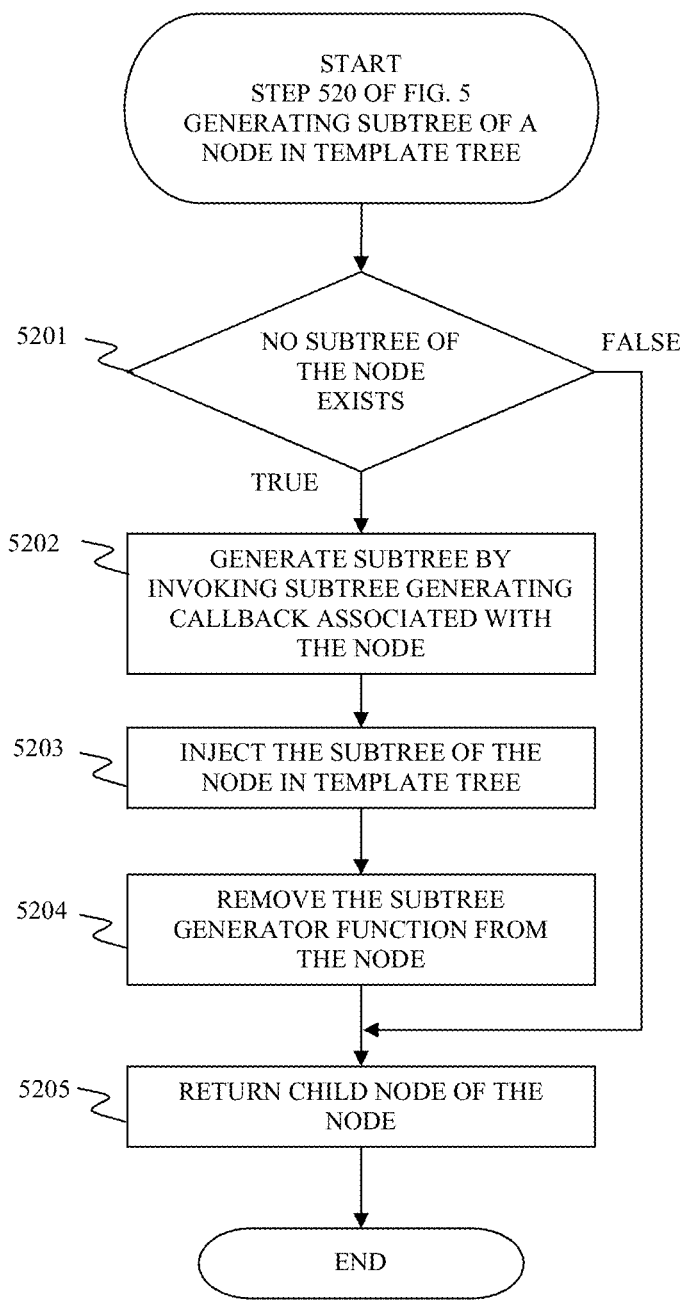
FIG. 6 is a flowchart depicting a method for generating subtree in a template tree pursuant to path information of a search request as performed in step 520 of FIG. 5, in accordance with the embodiments of the present invention.

FIG. 6 is a flowchart depicting a method for generating subtree in a template tree pursuant to path information of a search request as performed in step 520 of FIG. 5, supra, in accordance with the embodiments of the present invention.

The subtree generating procedure of FIG. 5 is invoked for each node in the path information of the search request to expand the template tree by a tree traversal procedure of the database system. Nodes in the template tree are traversed from a parent node to a child node and expanded in the same order as the traversal.

In step 5201, the subtree generating procedure determines, for a selected node in the template tree, whether the selected node already has a child node. If the subtree generating procedure determines that the selected node has a child node, the subtree generating procedure proceeds with step 5205 to return the child node because a subtree is already generated and the child node is a root node of the generated subtree. If the subtree generating procedure determines that the selected node does not have a child node, the subtree generating procedure proceeds with step 5202 to generate a subtree of the selected node.

In step 5202, the subtree generating procedure generates a subtree for the selected node by invoking a subtree generator callback function associated with the selected node of the template tree. The selected node in step 5202 is a subtree generator node in the template tree that is extended by the subtree generator callback function. All data necessary to construct the nodes in the generated subtree are collected from a respective component of the database system. The subtree generator callback function connects to other database components and retrieves necessary data from connected database components, and builds a subtree with the retrieved data.

While generating the subtree, it is necessary to handle errors encountered. Pursuant to the significance of an error, the error may be communicated back to the client program or may be ignored and produce a search result with a predefined default value.

In step 5203, the subtree generating procedure injects the generated subtree into the template tree as a subtree of the selected node. The generated subtree may be a full XML subtree with all nodes being materialized or may have some subtree generator nodes in the subtree.

In step 5204, the subtree generating procedure removes the subtree generator callback function from the selected node of the template tree because the selected node is expanded. Whether the selected node can be expanded may be marked with a tag, and after the selected node is expanded the node must be marked as a regular node which needs no more expansion. When a subtree generator node is traversed for the first time, the subtree generator node is expanded. Once a subtree is appended to the subtree generator node, the subtree generator node becomes a regular node without being associated with a subtree generating callback function.

In step 5205, the subtree generating procedure returns the child node of the selected node to the tree traversal procedure and terminates.

See a type definition _xmlTreeNode of FIG. 8, infra, and xmlGetChild( ) of FIG. 9, infra, for an embodiment of the subtree generating procedure.

FIG. 7 illustrates an example of tree node type employed in conventional XML documents.

A structure in C programming language is defined to implement a node in a conventional XML document in the example of FIG. 7.

A variable xmlTreeNode of type xmlTreeNode is declared in line E708. The type _xmlTreeNode is defined as a C struct comprising components declared in lines E702 to E707.

A type variable of xmlTreeNodeType type is declared as a first component of the _xmlTreeNode struct in line E702.

A xmlTagName variable of constant character pointer type is declared as a second component of the _xmlTreeNode struct in line E703.

A nodeText variable of character pointer type is declared as a third component of the _xmlTreeNode struct in line E704.

A parentNode variable of pointer to xmlTreeNode is declared as a fourth component of the _xmlTreeNode struct in line E705.

A child variable of pointer to xmlTreeNode is declared as a fifth component of the _xmlTreeNode struct in line E706.

A sibling variable of pointer to xmlTreeNode is declared as a sixth component of the _xmlTreeNode struct in line E707.

FIG. 8 illustrates an example of tree node type extended for a subtree generator callback function based on the tree node type of FIG. 7, supra, in accordance with the embodiments of the present invention.

The _xmlTreeNode type of FIG. 8 has two additional components to accommodate the subtree generator callback function.

Line E802 defines the subtree generator callback function pointer type xmlSubTreeGenerator, wherein a function pointed to by a variable of type xmlSubTreeGenerator takes a parameter of void pointer type that points to any data structure for an input to the function and returns a pointer to xmlTreeNode which points to a subtree generated by the function pointed by xmlSubTreeGenerator.

Lines E803 to E809 are analogous to the description of FIG. 7, supra.

In line E810, a function pointer variable subTreeGenerator of type xmlSubTreeGenerator is declared as a first additional component of the tree node xmlTreeNode.

In line E811, a void pointer type variable subTreeGeneratorData is declared as a second additional component of the tree node xmlTreeNode. The void pointer type variable subTreeGeneratorData points to an input data for the function pointer variable subTreeGenerator. The input data is of a type and content that are coordinated with a mechanism interpreting the input data in the subtree generator callback function.

The example tree node type may be implemented in other programming languages that support function pointer such as C++ or similar programming techniques. An object-oriented programming language may implement a tree node type having a subtree generator callback function with classes and inheritance or C++ templates. A subtree generator node is derived from a class implementing XML nodes. The callback function becomes a member method of the derived class. The same techniques as for C++ can be used for other object-oriented programming languages such as Java®. (Java is a registered trademark of Sun Microsystems, Inc., in the United States and/or other countries)

FIG. 9 illustrates an example of an operator referred to as xmlGetchild( ), in accordance with the embodiments of the present invention.

In line E901, the operator xmlGetChild( ) is defined as a function that takes an input node of pointer to xmlTreeNode type defined in FIG. 8, supra, and returns another pointer to xmlTreeNode type to a caller. xmlGetChild( ) is invoked by the caller during a traversal of the template tree to expand a subtree generator node with a valid pointer value.

In lines E903 to E905, the xmlGetChild( ) determines whether the input node is already expanded by examining a value of node->child. See description of step 5201 of FIG. 6, supra.

In lines E906 to E913, the xmlGetChild( ) expands the input node that has not been expanded in the template tree. In lines E908 to E910, the xmlGetchild( ) invokes the subtree generator callback function node->subTreeGenerator with node->subTreeGeneratorData and assigns a result of executing the subtree generator callback function to a variable generatedSubTree. See description of step 5202 of FIG. 6, supra.

In line E911, the xmlGetChild( ) injects the generatedSubTree into the template tree by assigning generatedSubTree to node->child. See description of step 5203 of FIG. 6, supra.

In line E912, the xmlGetChild( ) removes the subtree generator callback function from the input node by assigning NULL to node->subTreeGenerator. See description of step 5204 of FIG. 6, supra.

In lines E904 and E914, the xmlGetChild( ) returns node->child to the caller. See description of step 5205 of FIG. 6, supra.

The xmlGetChild( ) operator expands any node in the template tree whether a node is already expanded or not expanded yet. The xmlGetChild( ) operator is also referred to as a "descend-to-child" operator according to the order of the traversal from a parent node to a child node. During traversal of the template tree, because the xmlGetChild( ) operator encapsulates accesses to a child node of a node being processed from the traversal procedure that invokes the xmlGetChild( ) operator, the expansion of subtree is transparent to the traversal procedure. Consequently, any traversal procedure in the database system may utilize the xmlGetchild( ) operator to traverse a template XML tree and dynamically expand only necessary data nodes transparently and without significant overhead comparing to pruning a complete XML tree with XPath expressions.

Figure 10:
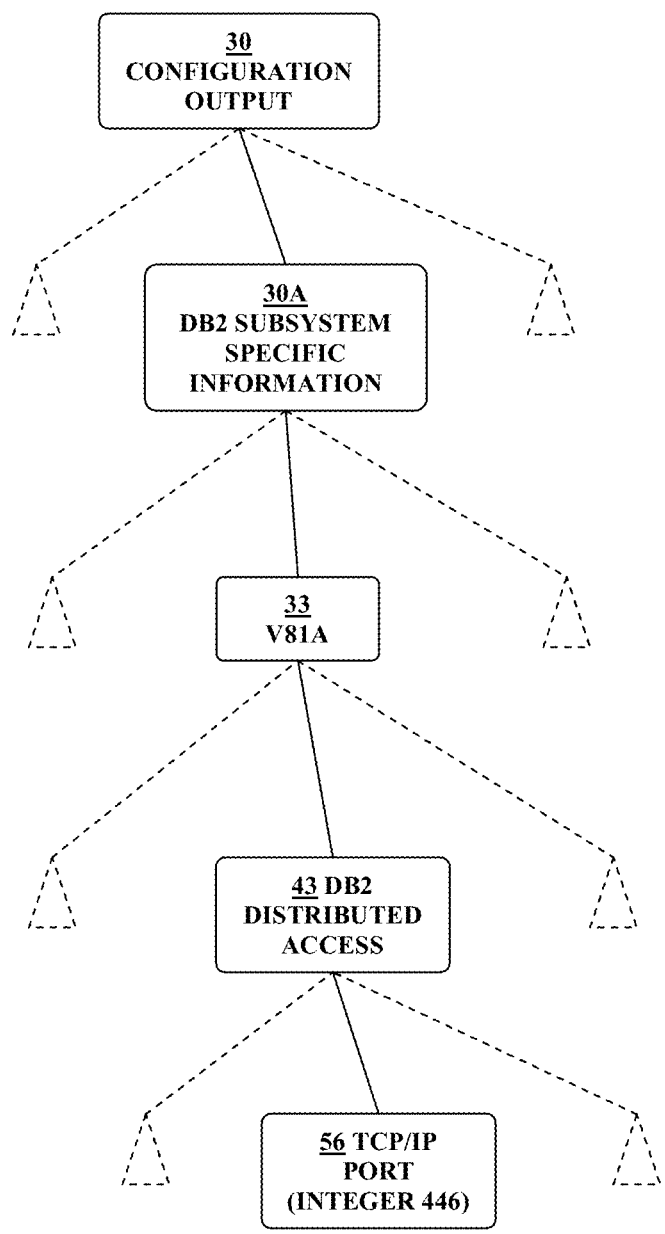
FIG. 10 illustrates an example of a final XML tree that is selectively constructed by the search request of the XPath expression of FIG. 2, from the template tree of FIG. 4, in accordance with the embodiments of the present invention.

FIG. 10 illustrates an example of a final XML tree that is selectively constructed by the search request of the XPath expression of FIG. 2, supra, from the template tree of FIG. 4, supra, in accordance with the embodiments of the present invention.

The Configuration Output key node 30 is a root node of the template tree on which the XPath expression begins to be applied. All child nodes of the Configuration Output key node 30 already exist. The DB2 Subsystem Specific Information key node 30A is traversed from the Configuration Output key node 30 pursuant to the XPath expression in line E112 of FIG. 2, supra.

The xmlGetChild( ) operator of FIG. 9, supra, first performs the subtree generator callback function on DB2 Subsystem Specific Information key node 30A pursuant to the XPath expression in line E112 of FIG. 2, supra.

The xmlGetChild( ) operator of FIG. 9, supra, subsequently performs the subtree generator callback function on V81A key node 33 pursuant to the XPath expression in line E113 of FIG. 2, supra. All child nodes other than the V81A key node 33 are discarded pursuant to the XPath expression.

The xmlGetChild( ) operator of FIG. 9, supra, subsequently performs the subtree generator callback function on DB2 Distributed Access Information key node 43 pursuant to the XPath expression in line E115 of FIG. 2, supra. All child nodes other than the DB2 Distributed Access Information key node 43 are discarded pursuant to the XPath expression.

After the subtree generator callback function is performed on DB2 Distributed Access Information key node 43, the DB2 Distributed Access Information key node 43 contains materialized information in child nodes of the DB2 Distributed Access Information key node 43. A subtree of the DB2 Distributed Access Information key node 43 might contain further generator callback nodes as well as already materialized information. In the example XML document of FIG. 3, supra, lines E252 to E263, the DB2 Distributed Access Information key node 43 comprises no subtree generator nodes and consequently all child nodes are materialized.

The traversal procedure of the database system looks up "TCP/IP Port" key node 56 pursuant to the XPath expression in line E116 of FIG. 2, supra. All child nodes other than the TCP/IP Port key node 56 and a sibling node of the TCP/IP Port key node 56 are discarded pursuant to the XPath expression of FIG. 2, supra.

According to the XPath expression in line E117 of FIG. 2, supra, the sibling of the TCP/IP Port key node that contains an integer 446 is returned to the client program that had sent the search request.

Figure 11:
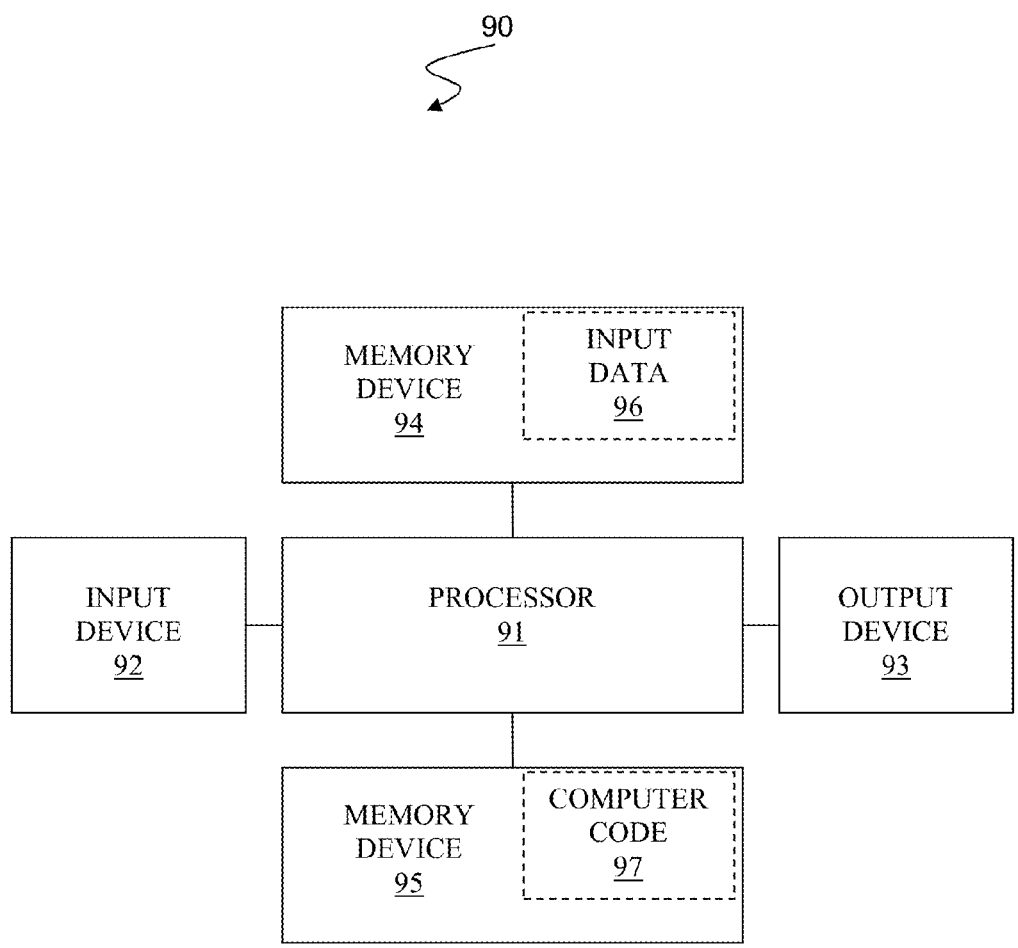
FIG. 11 illustrates a computer system used for selectively constructing a search result of a database system pursuant to a search request, in accordance with the embodiments of the present invention.

FIG. 11 illustrates a computer system used for selectively constructing a search result of a database system pursuant to a search request, in accordance with the embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for selectively constructing a search result pursuant to a search request according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for expanding a template tree, said method comprising:

receiving, by a processor of a computer system, a search request comprising (i) a search query and (ii) path information specifying at least one path of data nodes of the template tree, said template tree being a hierarchically organized data structure of data nodes, each specified path in the path information comprising a sequence of data nodes of the template tree;

traversing, by the processor, the data nodes in each sequence in each specified path and expanding each traversed data node that does not have a child node in the template tree to form in the template tree one or more child nodes corresponding to each expanded data node and not expanding each traversed data node that has a child node in the template tree; and instantiating, by the processor, each formed one or more child nodes with data values by retrieving the data values, in accordance with the search query, from at least one data source.

2. The method of claim 1, wherein said traversing comprises:
  traversing the data nodes in each sequence in a descending order of hierarchical level of the template tree and expanding each traversed data node not having any child node until all data nodes specified in each sequence have been traversed.

3. The method of claim 1, wherein said expanding comprises injecting each formed one or more child nodes into the template tree as a subtree at the respective expanded data node.

4. The method of claim 3, wherein said injecting comprises invoking a subtree generator callback function to generate the subtree for each formed one or more child nodes.

5. The method of claim 1, wherein the search query specifies a procedure to be executed for performing a search for the data values.

6. The method of claim 1, wherein said receiving the search request comprises receiving the search request from a user system, and wherein the method further comprises:
  transferring, by the processor to the user system, a search result comprising the data values at each instantiated one or more child nodes.

7. The method of claim 6, wherein the hierarchically organized data structure system and the search result are expressed in the Extensible Markup Language (XML), and wherein the path information is expressed in the XML Path Language (XPath).

8. A computer program product, comprising a computer readable hardware storage device having computer readable program code stored therein, said program code containing instructions which, upon being executed by a processor of a computer system, implement a method for expanding a template tree, said method comprising:
  receiving, by the processor, a search request comprising (i) a search query and (ii) path information specifying at least one path of data nodes of the template tree, said template tree being a hierarchically organized data structure of data nodes, each specified path in the path information comprising a sequence of data nodes of the template tree;
  traversing, by the processor, the data nodes in each sequence in each specified path and expanding each traversed data node that does not have a child node in the template tree to form in the template tree one or more child nodes corresponding to each expanded data node and not expanding each traversed data node that has a child node in the template tree; and
  instantiating, by the processor, each formed one or more child nodes with data values by retrieving the data values, in accordance with the search query, from at least one data source.

9. The computer program product of claim 8, wherein said traversing comprises:
  traversing the data nodes in each sequence in a descending order of hierarchical level of the template tree and expanding each traversed data node not having any child node until all data nodes specified in each sequence have been traversed.

10. The computer program product of claim 8, wherein said expanding comprises injecting each formed one or more child nodes into the template tree as a subtree at the respective expanded data node.

11. The computer program product of claim 10, wherein said injecting comprises invoking a subtree generator callback function to generate the subtree for each formed one or more child nodes.

12. The computer program product of claim 8, wherein the search query specifies a procedure to be executed for performing a search for the data values.

13. The computer program product of claim 8, wherein said receiving the search request comprises receiving the search request from a user system, and wherein the method further comprises:
  transferring, by the processor to the user system, a search result comprising the data values at each instantiated one or more child nodes.

14. The computer program product of claim 13, wherein the hierarchically organized data structure system and the search result are expressed in the Extensible Markup Language (XML), and wherein the path information is expressed in the XML Path Language (XPath).

15. A computer system comprising a processor, a memory coupled to the processor, and a computer readable hardware storage device coupled to the processor, said storage device containing program code which, upon being executed by the processor, implements a method for expanding a template tree, said method comprising:
  receiving, by the processor, a search request comprising (i) a search query and (ii) path information specifying at least one path of data nodes of the template tree, said template tree being a hierarchically organized data structure of data nodes, each specified path in the path information comprising a sequence of data nodes of the template tree;
  traversing, by the processor, the data nodes in each sequence in each specified path and expanding each traversed data node that does not have a child node in the template tree to form in the template tree one or more child nodes corresponding to each expanded data node and not expanding each traversed data node that has a child node in the template tree; and
  instantiating, by the processor, each formed one or more child nodes with data values by retrieving the data values, in accordance with the search query, from at least one data source.

16. The computer system of claim 15, wherein said traversing comprises:
  traversing the data nodes in each sequence in a descending order of hierarchical level of the template tree and expanding each traversed data node not having any child node until all data nodes specified in each sequence have been traversed.

17. The computer system of claim 15, wherein said expanding comprises injecting each formed one or more child nodes into the template tree as a subtree at the respective expanded data node.

18. The computer system of claim 17, wherein said injecting comprises invoking a subtree generator callback function to generate the subtree for each formed one or more child nodes.

19. The computer system of claim 15, wherein the search query specifies a procedure to be executed for performing a search for the data values.

20. The computer system of claim 15, wherein said receiving the search request comprises receiving the search request from a user system, and wherein the method further comprises:

transferring, by the processor to the user system, a search result comprising the data values at each instantiated one or more child nodes.

\* \* \* \* \*